(12) United States Patent
Negrete

(10) Patent No.: US 12,394,838 B2
(45) Date of Patent: Aug. 19, 2025

(54) TRACTION BATTERY COOLANT ASSEMBLY AND THERMAL MANAGEMENT METHOD

(71) Applicant: Ford Global Technologies, LLC, Dearborn, MI (US)

(72) Inventor: Justin Eugene Negrete, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 603 days.

(21) Appl. No.: 17/489,074

(22) Filed: Sep. 29, 2021

(65) Prior Publication Data

US 2023/0103198 A1    Mar. 30, 2023

(51) Int. Cl.

| | |
|---|---|
| *H01M 10/6568* | (2014.01) |
| *B60L 50/60* | (2019.01) |
| *B60L 50/64* | (2019.01) |
| *B60L 58/26* | (2019.01) |
| *H01M 10/613* | (2014.01) |
| *H01M 10/625* | (2014.01) |
| *H01M 10/6556* | (2014.01) |
| *H01M 50/209* | (2021.01) |
| *H01M 50/249* | (2021.01) |

(52) U.S. Cl.
CPC ......... *H01M 10/6568* (2015.04); *B60L 50/64* (2019.02); *B60L 50/66* (2019.02); *B60L 58/26* (2019.02); *H01M 10/613* (2015.04); *H01M 10/625* (2015.04); *H01M 10/6556* (2015.04); *H01M 50/209* (2021.01); *H01M 50/249* (2021.01); *H01M 2220/20* (2013.01)

(58) Field of Classification Search
CPC ................................................. H01M 10/6556
See application file for complete search history.

(56) References Cited

U.S. PATENT DOCUMENTS

| | | | |
|---|---|---|---|
| 4,706,737 A * | 11/1987 | Taylor | |
| 2013/0164593 A1* | 6/2013 | Burrows | |
| 2016/0366792 A1 | 12/2016 | Smith et al. | |
| 2017/0125858 A1* | 5/2017 | Miller | H01M 10/613 |
| 2020/0119416 A1* | 4/2020 | Kim | H01M 10/613 |
| 2020/0251698 A1 | 8/2020 | Paramasivam et al. | |

FOREIGN PATENT DOCUMENTS

| | | | |
|---|---|---|---|
| CN | 213546416 | 6/2021 | |
| FR | 2934087 A3 * | 1/2010 | .......... B60L 11/1818 |
| WO | 2020160739 | 8/2020 | |

* cited by examiner

*Primary Examiner* — Matthew T Martin
*Assistant Examiner* — Krishna R Hammond
(74) *Attorney, Agent, or Firm* — David B. Kelley; Carlson, Gaskey & Olds, P.C.

(57) ABSTRACT

A traction battery assembly includes battery arrays and a thermal exchange assembly of a battery pack. The thermal exchange assembly has passageways that each communicate coolant from a first side of the battery pack to an opposite, second side of the battery pack. An inlet conduit is on the first side. The inlet conduit is arranged such that the delivering of coolant to a first one of the passageways is upstream from the delivering of coolant to a second one of the passageways. An outlet conduit is on the second side. The outlet conduit is arranged such that the receiving of coolant from the first one of passageways to the outlet conduit is upstream from the receiving of coolant from the second one of the passageways to the outlet conduit.

11 Claims, 3 Drawing Sheets

TRACTION BATTERY COOLANT ASSEMBLY AND THERMAL MANAGEMENT METHOD

TECHNICAL FIELD

This disclosure relates generally to communicating coolant through a battery pack in a way that reduces flow pressure loss.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines, and potentially other electrical loads of the electrified vehicle. The traction battery can include battery arrays each including a plurality of interconnected battery cells that store energy. Coolant can be move through the traction battery to manage thermal energy levels.

SUMMARY

In some aspects, the techniques described herein relate to a traction battery assembly, including: a plurality of battery arrays of a battery pack; a thermal exchange assembly having a plurality of passageways that each communicate coolant from a first side of the battery pack to an opposite, second side of the battery pack; an inlet conduit on the first side, the inlet conduit configured to deliver the coolant to a first one of the plurality of passageways and to deliver the coolant to a second one of the plurality of passageways, the inlet conduit arranged such that the delivering of coolant to the first one of the plurality of passageways is upstream from the delivering of coolant to the second one of the plurality of passageways; and an outlet conduit on the second side, the outlet conduit configured to receive the coolant from the first one of the plurality of passageways and receive the coolant from the second one of the plurality of passageways, the outlet conduit arranged such that the receiving of coolant from the first one of the plurality of passageways is upstream from the receiving of coolant from the outlet conduit to the second one of the plurality of passageways.

In some aspects, the techniques described herein relate to a traction battery assembly, wherein the plurality of battery arrays are disposed along a pack axis that extends from a front end of the battery pack to a rear end of the battery pack.

In some aspects, the techniques described herein relate to a traction battery assembly, wherein the inlet conduit and the outlet conduit both extend through the rear end of the battery pack.

In some aspects, the techniques described herein relate to a traction battery assembly, wherein the inlet conduit and the outlet conduit both extend through the front end of the battery pack or both extend through the rear end of the battery pack, wherein one of the inlet conduit or the outlet conduit is looped such that coolant moves axially in a first direction and then in an opposite, second axial direction.

In some aspects, the techniques described herein relate to a traction battery assembly, wherein the battery arrays each include a plurality of battery cells disposed along a respective array axis that is perpendicular to the pack axis.

In some aspects, the techniques described herein relate to a traction battery assembly, wherein the battery pack is a multi-tier battery pack such that a first battery module of the plurality of battery arrays and the first one of the plurality of passageways are vertically beneath a second battery module of the plurality of battery arrays and the second one of the plurality of passageways, wherein the inlet conduit and the outlet conduit both extend through a front end of the battery pack or both extend through a rear end of the battery pack.

In some aspects, the techniques described herein relate to a traction battery assembly, wherein openings to the first and second passageways from the inlet conduit are the same diameter, and openings from the first and second passageways to the outlet conduit are the same diameter.

In some aspects, the techniques described herein relate to a traction battery assembly, wherein the inlet conduit and the outlet conduit are flexible or rigid hoses.

In some aspects, the techniques described herein relate to a traction battery assembly, wherein the coolant is a liquid coolant.

In some aspects, the techniques described herein relate to a traction battery assembly, wherein the plurality of battery arrays are disposed atop the thermal exchange assembly such that first one of the plurality of passageways is beneath one of the plurality of arrays, and a second one of the plurality of battery arrays is beneath another one of the plurality of arrays.

In some aspects, the techniques described herein relate to a traction battery assembly, wherein the first side is driver side and the second side is a passenger side.

In some aspects, the techniques described herein relate to a traction battery, wherein upstream with reference to a general direction of flow through the respective inlet conduit or outlet conduit.

In some aspects, the techniques described herein relate to a thermal management method for a battery pack, including: delivering coolant from an inlet conduit to a first passageway of a thermal exchange assembly; delivering coolant from the inlet conduit to a second passageway of the thermal exchange assembly, the inlet conduit arranged such that delivering of coolant to the first passageway from the inlet conduit is upstream from the delivering of coolant to the second passageway from the inlet conduit; receiving coolant from the first passageway at an outlet conduit; and receiving coolant from the second passageway at the outlet conduit, the outlet conduit arranged such that the coolant from the first passageway is received upstream from the receiving of coolant of the coolant from the second passageway.

In some aspects, the techniques described herein relate to a thermal management method, wherein upstream is with reference to a general direction of flow through the inlet conduit and the outlet conduit.

In some aspects, the techniques described herein relate to a thermal management method, wherein the inlet conduit and the outlet conduit both extend through a front end of the battery pack or both extend through a rear end of the battery pack.

In some aspects, the techniques described herein relate to a thermal management method, wherein the battery pack is a multi-tier battery pack such that the first passageway is vertically beneath the second passageway.

In some aspects, the techniques described herein relate to a thermal management method, wherein one of the inlet conduit or the inlet conduit is looped such that coolant moves axially in a first direction and then in an opposite, second axial direction.

In some aspects, the techniques described herein relate to a thermal management method, further including managing thermal energy in a first battery module using the first passageway, and managing thermal energy in a second battery module using the second passageway.

In some aspects, the techniques described herein relate to a thermal management method, wherein a diameter of an opening to the first passageway is the same as a diameter of an opening to the second passageway, wherein a diameter of an opening from the first passageway is the same as a diameter of an opening from the second passageway.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details assemblies and methods associated with moving coolant through a battery pack. The coolant is moved through the battery pack in a way that helps to reduce pressure losses associated with moving the coolant through the battery.

Figure 1:
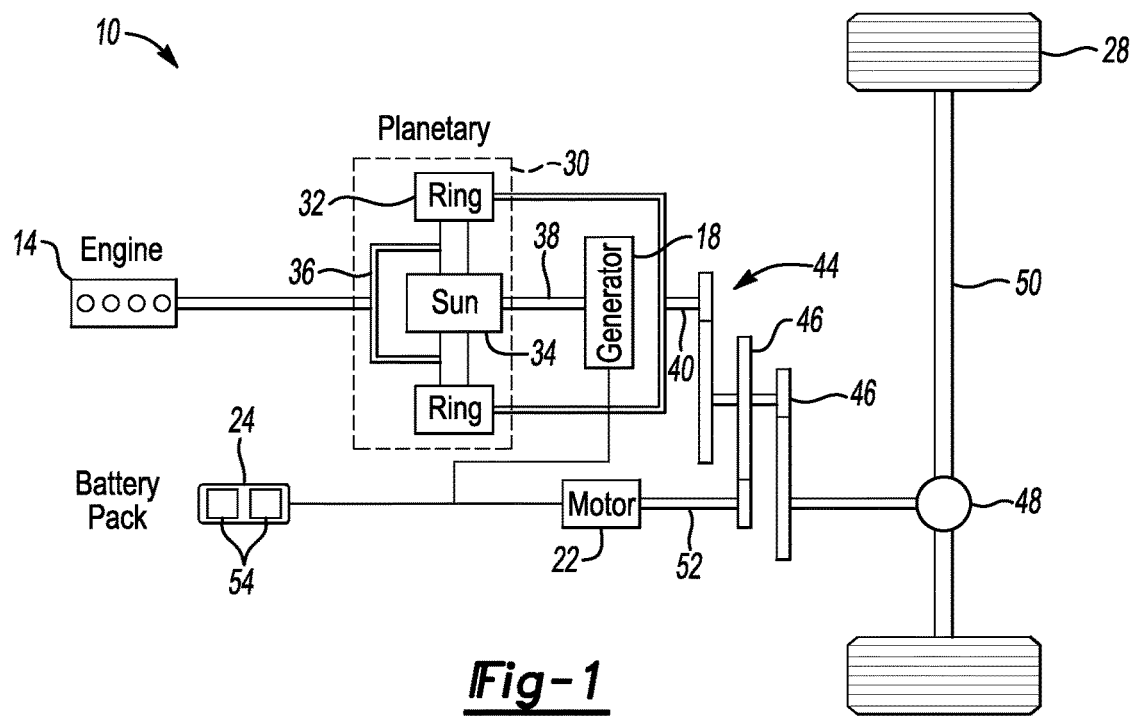
FIG. 1 illustrates a highly schematic view of a powertrain for an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. The battery pack 24 is a traction battery pack as the battery pack 24 can provides power to propel the vehicle drive wheels 28. The battery pack 24 includes a plurality of battery arrays 54.

Figure 2:
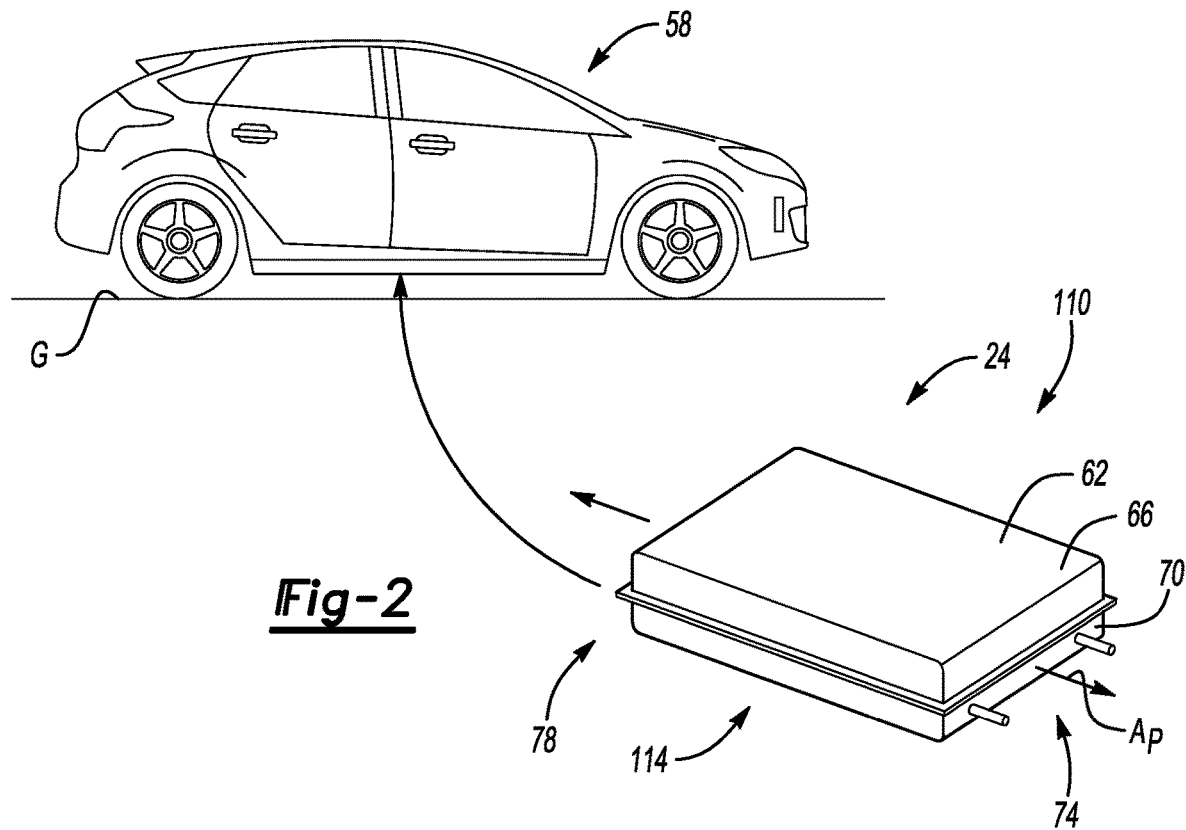
FIG. 2 illustrates how a battery pack of the powertrain of FIG. 1 can be positioned within the electrified vehicle according to an exemplary aspect of the present disclosure.
Figure 3:
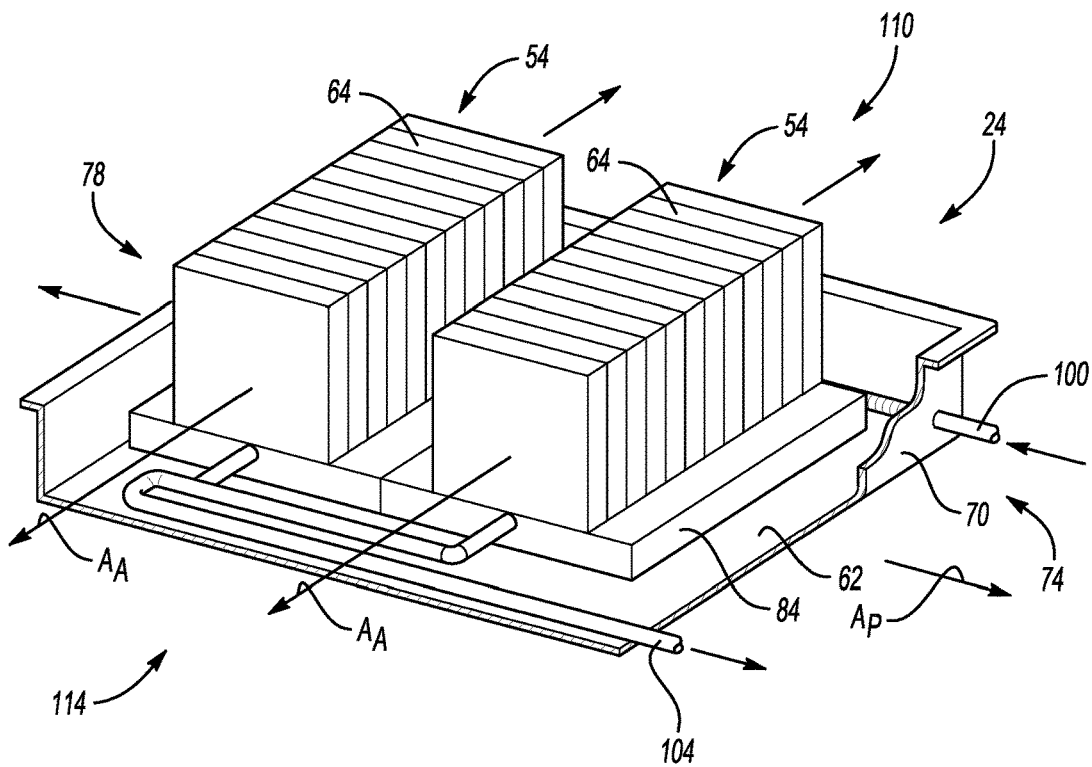
FIG. 3 illustrates a perspective view of the battery pack of FIG. 2 with selected portions removed to reveal an interior area of battery pack.
Figure 4:
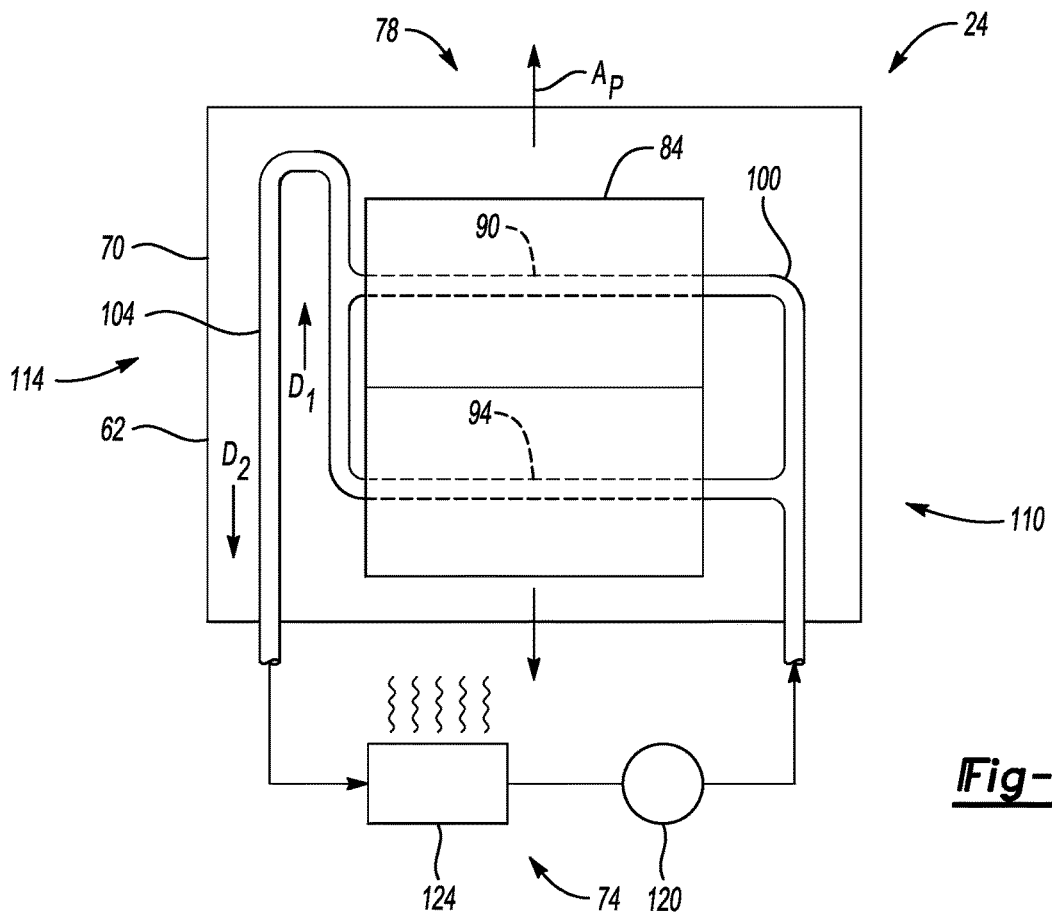
FIG. 4 illustrates a top view of selected portion of the battery pack of FIG. 3 in highly schematic form.

With reference to FIG. 2-4, the battery pack 24 can be secured to an electrified vehicle 58 and, in particular, to an underside of the electrified vehicle 58. The battery pack 24, in this example, includes two battery arrays 54 held within an interior area provided by an enclosure 62. In other examples, the battery pack 24 could include more than two battery arrays, or a single battery array, within the enclosure 62. Each of the battery arrays 54 can include a plurality of individual battery cells 64. The battery cells 64 for each of the battery arrays 54 are distributed along a respective array axis $A_A$.

The example enclosure 62 includes a cover 66 and a tray 70. The cover 66 and tray 70 can be polymer-based. Alternatively, the cover 66, the tray 70, or both can be a metal or metal alloy.

The battery arrays 54 are disposed along a pack axis $A_P$ that extends from a front end 74 of the battery pack 24 to a rear end 78 of the battery pack 24. Front and rear are with reference to the general orientation of the battery pack 24 when the battery pack 24 is installed within the vehicle 58. The pack axis $A_P$ runs parallel with a longitudinal axis of the vehicle 58 in this example. The array axes $A_A$ are perpendicular to the pack axis $A_P$ in this example During operation of the vehicle 58, operation of the battery pack 24, or both, thermal energy levels within the battery pack 24 can change. Coolant can be moved through areas within the battery pack 24 to exchange thermal energy with areas of the battery pack 24, which can cool or heat these areas. The coolant can be a liquid coolant.

In this example, the battery pack 24 includes a thermal exchange assembly 84 that helps to communicate coolant and manage thermal energy within the battery pack 24. The battery arrays 54 are disposed adjacent the thermal exchange assembly 84. Thermal energy can move, for example, from the battery arrays 54, to the thermal exchange assembly 84, and to coolant communicating through the thermal exchange assembly 84.

The example thermal exchange assembly 84 includes a first passageway 90 and a second passageway 94 that is separate and distinct from the first passageway 90. The first passageway 90 extends through the thermal exchange assembly 84 directly beneath one of the battery arrays 24. The second passageway 94 extends through the thermal exchange assembly 84 directly beneath the other one of the battery arrays 24. The thermal exchange assembly 84 can include separate plate structures that each provide one of the first or the second passageways 90, 94. The thermal exchange assembly 84 could instead be a single monolithic structure.

The first and second passageways 90, 94 are each beneath only one of the battery arrays 54 in this example. In other examples, the first and second passageways 90, 94 could each extend beneath or adjacent to more than one of the battery arrays 54.

In this example, an inlet conduit 100 and an outlet conduit 104 are used to communicate coolant between the thermal exchange assembly 84 and an exterior of the battery pack 24. The inlet conduit 100 and the outlet conduit 104 could be a polymer-based material such as rubber, a metal, or a metal alloy. The inlet conduit 100 and the outlet conduit 104 are flexible hoses in this example. Notably, several individual structures can be joined together to provide the inlet conduit 100. Similarly, several individual structures can be joined together to provide the outlet conduit 104.

The inlet conduit 100 and the outlet conduit 104 are on opposite sides of the battery pack 24. In this example, the inlet conduit 100 is on a first side 110 of the battery pack 24 and the outlet conduit 104 is on a second side 114 of the battery pack 24. The first side 110 is on the driver side and the second side 114 is the passenger side in this example. The first and second passageways 90, 94 deliver coolant from the first side 110 to the second side 114.

The inlet conduit 100 delivers coolant to the thermal exchange assembly 84 and, more particularly, delivers coolant to both the first passageway 90 and the second passageway 94 defined by the thermal exchange assembly 84. The outlet conduit 104 receives coolant from the thermal exchange assembly 84 and, more particularly, from both the first passageway 90 and the second passageway 94.

In this example, a pump 120 outside the battery pack 24 circulates coolant through the inlet conduit 100, the thermal exchange assembly 84, and the outlet conduit 104. Coolant from the outlet conduit 104 moves to a thermal energy exchanger 124, which, when the coolant is a liquid coolant, can be a liquid-to-air heat exchanger.

In this example, the inlet conduit 100 and the outlet conduit 104 both extend through the front end 74 of the battery pack 24. In another example the inlet conduit 100 and the outlet conduit 104 both extend through the rear end 78 of the battery pack 24.

One of the inlet conduit 100 or the outlet conduit 104, here the outlet conduit 104, is looped or doubled back. Due to the looping, coolant moves through the outlet conduit 104 in a first axial direction D1 and then turns and moves through the outlet conduit 104 in an opposite, second axial direction D2.

Without the looping of the outlet conduit 104, the coolant that is moved through the first passageway 90 would travel a greater distance than the coolant moved through the battery pack 24. The looping helps to ensure that the coolant moved through the battery pack 24 all travels about the same distance when circulating through the battery pack 24.

In this example, the inlet conduit 100 is arranged such that the delivering of coolant to passageway 94 is upstream from the delivering of coolant to the passageway 90. The outlet conduit 104 is arranged such that the receipt of coolant from the passageway 94 is upstream from the receipt of coolant from the passageway 90. Upstream with reference to a general direction of flow through the inlet conduit 100 and outlet conduit 104. Accordingly, to exit the battery pack 24, coolant that has moved through the passageway 94 travels a further distance than coolant that has moved through the passageway 90. This compensates for the greater distances that the coolant moved through the passageway 90 must travel to reach the passageway 90 when compared to the coolant moved through the passageway 94.

In the past, because of, among other things, different distances that coolant travels within a battery pack, resulted in flow pressure losses associated with moving coolant through the battery pack. To reduce these flow pressure losses, many battery packs incorporated restrictors within the coolant flow path. For example, a diameter of the shortest flow path would be reduced relative to a diameter of a longer flow path. Incorporating restrictors, among other things, added build complexity and further increases flow pressure losses.

In this example, an opening to the passageway 90 has a diameter that is the same as a diameter opening to the passageway 94. Also, an opening from the passageway 90 has a diameter that is the same as a diameter of an opening from the passageway 94.

Returning again to FIGS. 3 and 4, due to the looping of the inlet conduit 100 or the outlet conduit 104, the flow pressure loss associated with circulating coolant through the battery pack 24 is reduced. This can reduce or eliminate the need for restrictors.

Figure 5:
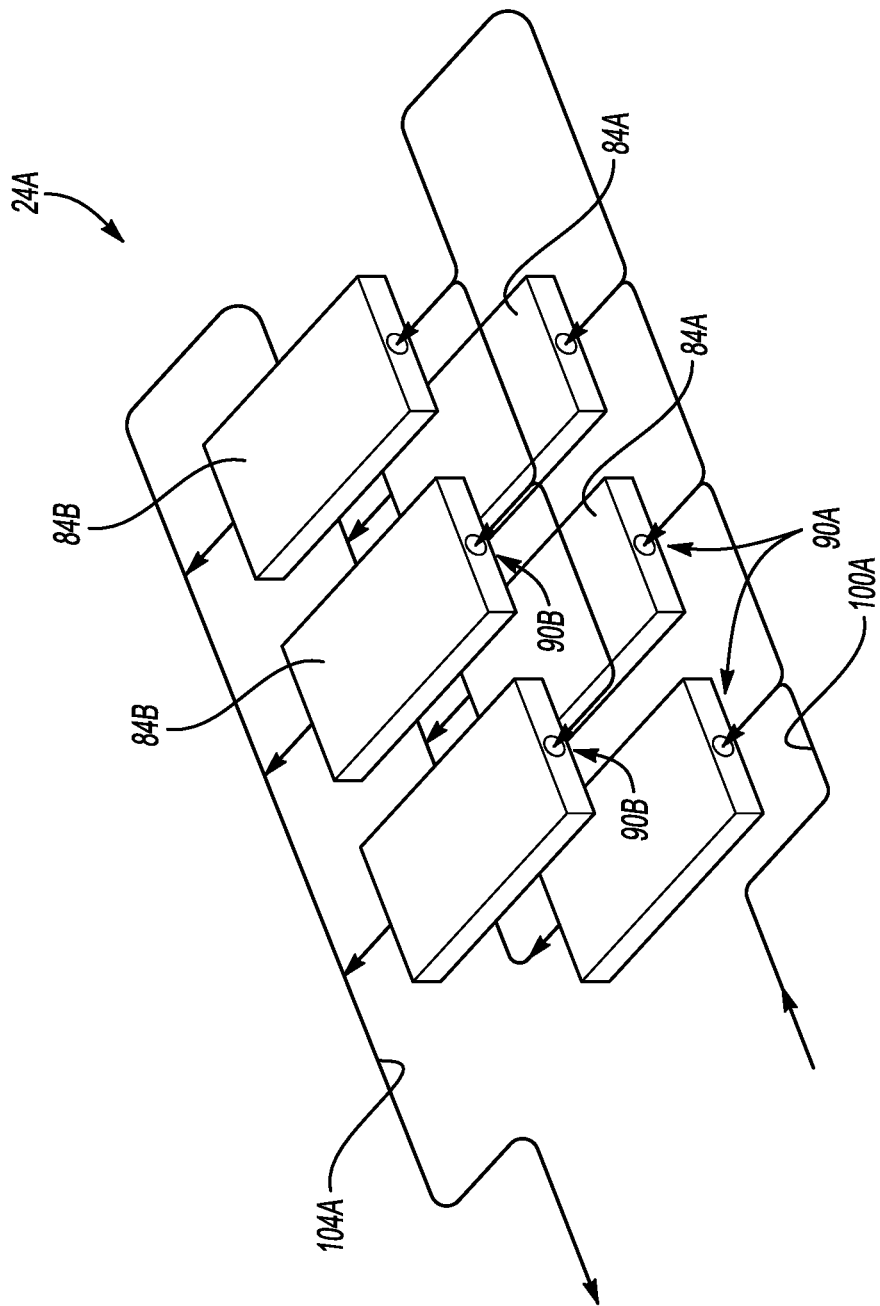
FIG. 5 illustrates a schematic perspective view of a selected portions of a battery pack according to another exemplary embodiment of the present disclosure.

With reference to FIG. 5, this approach can be incorporated into a multi-tier battery pack 24A where battery arrays and thermal exchange assemblies 84A are on a lower tier that is vertically beneath other battery arrays and thermal exchanges assemblies 84B on an upper tier. Vertical is with reference to ground and a general orientation of the vehicle 58 (FIG. 2) during operation.

An inlet conduit 100A delivers coolant to passageways 90A associated with battery arrays of a vertically lower tier, and then to passageways 90B associated with battery arrays of a vertically upper tier. An outlet conduit 104A receives coolant from the passageways 90A of the lower tier and then from the passageways 90B of the upper tier. Accordingly, coolant exiting the multi-tier battery pack 24A all travels about the same distance within the battery pack 24A.

The inlet conduit 100A and the outlet conduit 104A interfaces with a common end of the battery pack 24A. The inlet conduit 100A and the outlet conduit 104A are on opposite sides of the battery pack 24A.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery assembly, comprising:
   a plurality of battery arrays of a battery pack;
   a thermal exchange assembly having a plurality of passageways that each communicate coolant from a first side of the battery pack to an opposite, second side of the battery pack;
   an inlet conduit on the first side, the inlet conduit configured to deliver the coolant to a first one of the plurality of passageways and to deliver the coolant to a second one of the plurality of passageways, the inlet conduit arranged such that the delivering of coolant to the first one of the plurality of passageways is upstream from the delivering of coolant to the second one of the plurality of passageways; and
   an outlet conduit on the second side, the outlet conduit configured to receive the coolant from the first one of the plurality of passageways and receive the coolant from the second one of the plurality of passageways, the outlet conduit arranged such that the receiving of coolant from the first one of the plurality of passageways is upstream from the receiving of coolant from the second one of the plurality of passageways,
   the plurality of battery arrays are disposed along a pack axis that extends from a front end of the battery pack to a rear end of the battery pack; and
   the inlet conduit and the outlet conduit both extend through the rear end of the battery pack.

2. A traction battery assembly, comprising:
   a plurality of battery arrays of a battery pack;
   a thermal exchange assembly having a plurality of passageways that each communicate coolant from a first side of the battery pack to an opposite, second side of the battery pack;
   an inlet conduit on the first side, the inlet conduit configured to deliver the coolant to a first one of the plurality of passageways and to deliver the coolant to a second one of the plurality of passageways, the inlet conduit arranged such that the delivering of coolant to the first one of the plurality of passageways is upstream from the delivering of coolant to the second one of the plurality of passageways; and
   an outlet conduit on the second side, the outlet conduit configured to receive the coolant from the first one of the plurality of passageways and receive the coolant from the second one of the plurality of passageways, the outlet conduit arranged such that the receiving of coolant from the first one of the plurality of passageways is upstream from the receiving of coolant from the second one of the plurality of passageways,
   wherein the inlet conduit and the outlet conduit both extend through the front end of the battery pack or both extend through the rear end of the battery pack, wherein one of the inlet conduit or the outlet conduit is looped such that coolant moves axially in a first direction and then in an opposite, second axial direction.

3. The traction battery assembly of claim 1, wherein the battery arrays each include a plurality of battery cells disposed along a respective array axis that is perpendicular to the pack axis.

4. A traction battery assembly, comprising:
   a plurality of battery arrays of a battery pack;
   a thermal exchange assembly having a plurality of passageways that each communicate coolant from a first side of the battery pack to an opposite, second side of the battery pack;
   an inlet conduit on the first side, the inlet conduit configured to deliver the coolant to a first one of the plurality of passageways and to deliver the coolant to a second one of the plurality of passageways, the inlet conduit arranged such that the delivering of coolant to the first one of the plurality of passageways is upstream from the delivering of coolant to the second one of the plurality of passageways; and
   an outlet conduit on the second side, the outlet conduit configured to receive the coolant from the first one of the plurality of passageways and receive the coolant from the second one of the plurality of passageways, the outlet conduit arranged such that the receiving of coolant from the first one of the plurality of passageways is upstream from the receiving of coolant from the second one of the plurality of passageways,
   wherein the battery pack is a multi-tier battery pack such that a first battery array of the plurality of battery arrays and the first one of the plurality of passageways are vertically beneath a second battery array of the plurality of battery arrays and the second one of the plurality of passageways, wherein the inlet conduit and the outlet conduit both extend through a front end of the battery pack or both extend through a rear end of the battery pack.

5. The traction battery assembly of claim 1, wherein openings to the first and second passageways from the inlet conduit are the same diameter, and openings from the first and second passageways to the outlet conduit are the same diameter.

6. The traction battery assembly of claim 1, wherein the inlet conduit and the outlet conduit are flexible hoses.

7. The traction battery assembly of claim 1, wherein the coolant is a liquid coolant.

8. The traction battery assembly of claim 1, wherein the plurality of battery arrays are disposed atop the thermal exchange assembly such that first one of the plurality of passageways is beneath one of the plurality of arrays, and a second one of the plurality of battery arrays is beneath another one of the plurality of arrays.

9. The traction battery assembly of claim 1, wherein the first side is driver side and the second side is a passenger side.

10. The traction battery of claim 1, wherein upstream is with reference to a general direction of flow through the respective inlet conduit or outlet conduit.

11. The traction battery of claim 1, wherein the thermal exchange assembly is a separate and distinct component from the plurality of battery arrays of the battery pack.

* * * * *